United States Patent [19]
O'Brien et al.

[11] Patent Number: 5,986,039
[45] Date of Patent: Nov. 16, 1999

[54] BRANCHED POLYESTERS PREPARED FROM HYDROXYFUNCTIONAL COMPONENTS WITH FUNCTIONALITY IN EXCESS OF TWO AND THEIR USE IN PHYSIOLOGICAL SEPARATION VEHICLES

[75] Inventors: William L. O'Brien, Cincinnati; Alan C. Kilbarger, Milford, both of Ohio

[73] Assignee: Henkel Corporation, Gulph Mills, Pa.

[21] Appl. No.: 08/951,917

[22] Filed: Oct. 16, 1997

Related U.S. Application Data

[60] Provisional application No. 60/029,384, Oct. 29, 1996.

[51] Int. Cl.$^6$ .................................................. C08G 64/00
[52] U.S. Cl. ........................... 528/272; 528/176; 528/193; 528/194; 528/271
[58] Field of Search ..................................... 528/176, 193, 528/194, 271, 272

[56] References Cited

U.S. PATENT DOCUMENTS

| | | | |
|---|---|---|---|
| 2,793,219 | 5/1957 | Barrett et al. | 260/407 |
| 2,955,121 | 10/1960 | Myers et al. | 260/407 |
| 4,101,422 | 7/1978 | Lamont et al. | 210/84 |
| 4,148,764 | 4/1979 | Lamont et al. | 260/22 |
| 5,124,434 | 6/1992 | O'Brien | 528/272 |
| 5,506,333 | 4/1996 | O'Brien et al. | 528/272 |

*Primary Examiner*—Terressa Mosley
*Attorney, Agent, or Firm*—Wayne C. Jaeschke; Martin G. Meder; Joanne Mary Fobare Rossi

[57] ABSTRACT

Polyesters are described which are substantially the condensation products of at least one dicarboxylic acid, at least one volatile diol and at least one hydroxyl-functional component with functionality greater than 2 which controls ultimate viscosity. The products are suitable vehicles for the formulated thixotropic gels for centrifugal separation of fluids such as serum into high and low density components of, for example, separation of mixtures of cells on the basis of density.

41 Claims, 1 Drawing Sheet

BRANCHED POLYESTERS PREPARED FROM HYDROXYFUNCTIONAL COMPONENTS WITH FUNCTIONALITY IN EXCESS OF TWO AND THEIR USE IN PHYSIOLOGICAL SEPARATION VEHICLES

CROSS-REFERENCE TO RELATED APPLICATIONS

This application claims priority from U.S. provisional application Ser. No. 60/029,384 filed Oct. 29, 1996, the disclosure of which is incorporated herein by reference.

FIELD OF THE INVENTION

The present invention relates to polyester fluids useful for preparing physiological separation vehicles, which are useful for facilitating separations such as of blood serum or plasma from the cellular portion of blood.

BACKGROUND OF THE INVENTION

The polyester fluids of the invention are conveniently formulated into a partitioning composition for use in a blood collection vessel in which the blood sample is subjected to centrifugation until the cellular portion and serum or plasma are completely separated.

Note that while blood is the most usual candidate for physiological separation, conceivably urine, milk, sputum, stool solutions, meconium, pus, semen, spinal fluid and the like could all be subject to physiological separation and assay for therapeutic agents and the subsequent discussion, while focusing on blood for clarity, is not meant to be limited to blood.

The physical and chemical properties of the partitioning composition are such that a continuous, integral seal is provided between the separated blood phases, thereby maintaining separation of the phases after centrifugation and simplifying removal of the serum or plasma from the blood collection vessel. The high volume testing of blood components in hospitals and clinics has led to the development of various devices to simplify the collection of blood samples and preparation of the samples for analysis. Typically, whole blood is collected in an evacuated, elongated glass tube that is permanently closed at one end and sealed at the other end by a rubber stopper having a diaphragm which is penetrated by the double-tipped cannula used to draw the patient's blood. After the desired quantity of blood is collected, the collection vessel is subjected to centrifugation to yield two distinct phases comprising the cellular portion of the blood (heavy phase) and the blood serum or plasma (light phase). The light phase is typically removed from the collection vessel, e.g., via pipette or decantation, for testing.

It has been proposed heretofore to provide manufactured, seal-forming members, e.g., resilient pistons, spools, discs and the like, in blood collection vessels to serve as mechanical barriers between the two separated phases. Because of the high cost of manufacturing such devices to the close tolerances required to provide a functional seal, they have been supplanted by fluid sealant compositions. Fluid sealant compositions are formulated to have a specific gravity intermediate that of the two blood phases sought to be separated, so as to provide a partition at the interface between the cellular and serum phases. Such compositions typically include a polymer base material, one or more additives for adjusting the specific gravity and viscosity of the resultant composition, and optionally, a network former. Representative fluid sealant compositions developed in the past include: styrene beads coated with an anti-coagulant; silicone fluid having silica dispersed therein; a homogenous, hydrophobic copolyester including a suitable filler, e.g., silica; a liquid α-olefin-dialkylmaleate, together with an aliphatic amine derivative of smectite clay or powdered silica; the reaction product of a silicone fluid with a silica filler and a network former; and a mixture of compatible viscous liquids, e.g., epoxidized vegetable oil and chlorinated polybutene, and a thixotropy-imparting agent, e.g., powdered silica, and liquid polyesters. Also, random copolymers have been made of a diol and large quantities of a dicarboxylic acid with pendent, long ($C_9$ to $C_{13}$) olefin groups as well as random copolymers of a diol and large quantities of a dicarboxylic with a long olefin along its backbone, such as a $C_{36}$ dimerized fatty acid. Such polyester compositions have proved useful as functional blood partitioning compositions having reduced affinity for therapeutic agents present in blood such as phenobarbital and imipramine. See, for example, W. L. O'Brien, U.S. Pat. No. 5,124,434, the entire disclosure of which is incorporated by reference in the present specification, as if set forth herein in full.

Ideally, a commercially useful blood partitioning composition should maintain uniform physical and chemical properties for extended time periods prior to use, as well as during transportation and processing of blood samples, readily form a stable partition under normal centrifugation conditions and be relatively inert or unreactive toward the substance(s) in the blood, therapeutic and otherwise, whose presence or concentration is to be determined.

SUMMARY OF THE INVENTION

The invention is a viscous liquid branched polyester, which comprises the reaction product of at least one hydroxyl-functional initiator with functionality greater than 2, at least one dicarboxylic acid chain extender, at least one diol chain extender and at least one monocarboxylic acid chain terminator. The invention includes process for making the polymer and its use in physiological separation vehicles.

The polyester fluids of the invention are readily formulated together with other ingredients, typically a suitable filler, such as silica, and compatible surfactant or other coupling agent, into functional blood partitioning compositions, as is well known in the art. The density of the finished blood partitioning composition is controlled within prescribed limits, so that during centrifugation the composition becomes stably positioned at the interface between the serum or plasma phase and heavier cellular phase and, when centrifugation is terminated, forms a continuous integral barrier within the blood collection vessel to prevent the two phases from recombining or mixing, especially when decanting or pipetting the serum or plasma. The blood partitioning compositions of the invention are advantageously employed in small amounts, on the order of 1–5 g., in a 10 ml blood collection vessel of the type previously described which are then ready for use in blood sampling and analysis in the usual way. The polyester-based physiological separation vehicles of the present invention are especially suited for use in blood separation procedures.

Principle advantages of the invention include: 1) Relatively high purity, highly reactive components produced inexpensively in high tonnages are employed. 2) Procedures are simple and self-limiting to a large extent. 3) Residual monomer content is extremely low. 4) A useful density range for use with or without fillers is readily available. 5) Metallic catalyst residues are absent since no ester interchange procedure is necessary to achieve target viscosity. Note that, except in the examples, all quantities found hereinafter shall be understood to be modified by the term "about."

DETAILED DESCRIPTION OF THE INVENTION

Figure 1:
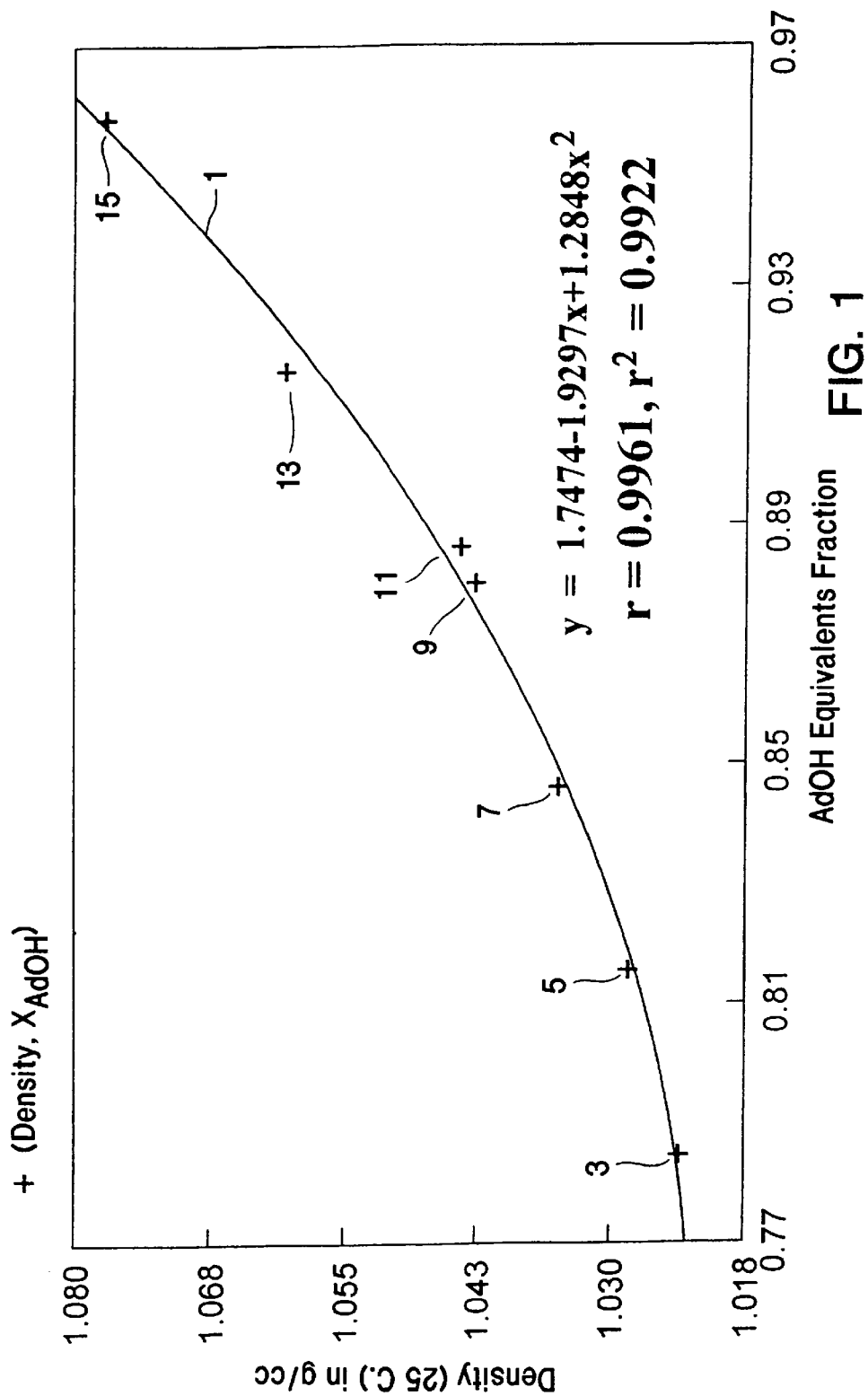
FIG. 1 shows density of the resulting polyester as a function 1 of the equivalents fraction of the adipic acid (AdOH) from which it is made, for several embodiments of the invention.

The polyester is made by condensation reaction of the ingredients, the hydroxyl-functional initiator, the diol, the dicarboxylic acid and the monocarboxylic acid.

The best results in terms of progress toward the target viscosities were obtained using reactor charges comprising a triol-diol mixture, a mixture of two dicarboxylic acids in equivalent ratios appropriate to provide the desired density and a monocarboxylic acid to control functionality and limit molecular growth. The small amount of organic distillates which accompany the water of reaction are not recaptured. Table 1 and the equation following are believed to describe preferred embodiments of the invention. Table 1 is in the form of a matrix, the equivalents (e) of each reactant being multiplied and summed with the functionality (f) of each reactant to arrive at the theoretical gel point desired.

TABLE 1

| n | Reactants, equivalents of which are "e" | Typical Equivalent Weight | Functionality "f" |
|---|---|---|---|
| 1 | isostearic acid | 286 | 1 |
| 2 | pelargonic acid | 125 | 1 |
| 3 | adipic acid | 73 | 2 |
| 4 | dodecanedioc acid | 115 | 2 |
| 5 | phthalic anhydride | 74 | 2 |
| 6 | mother liquor acid~$C_8$ acid | 91 | 2 |
| 7 | azelaic acid | 95 | 2 |
| 8 | dimer acid | 288 | 2 |
| 9 | propylene glycol | 38 | 2 |
| 10 | 1,3-butylene glycol | 45 | 2 |
| 11 | 1,4-butanediol | 45 | 2 |
| 12 | ethylene glycol | 31 | 2 |
| 13 | neopentyl glycol | 52 | 2 |
| 14 | trimethylolpropane | 43.3 | 3 |
| 15 | glycerol | 31 | 3 |
| 16 | APG-12 | 94.3 | 5.25 |

The critical gel point ($\alpha_c$), equals $1/(f_{avg}-1)$, which in turn can be calculated for each embodiment via the relationship: $\alpha_c = 1/((\Sigma(e_{1-16} \cdot f_{1-16})/\Sigma e_{1-16})-1)$. Adjustment of the formulas to provide a critical gel point ($\alpha_c$) of 0.83 or slightly higher, to 0.93, permits viscosities between 2500 and 10,000 cSt at 99° C. to be obtained without gelation.

The viscosity target is $\geq 3000$ cSt/99° C. and the density target is $\rho_{25}=1.02-1.045$ g/cc (preferably 1.02–1.035 g/cc) and $\geq 1.05$ g/cc, using adipic-dimer and phthalic dimer, respectively.

The presence of one volatile diol is advantageous for reasons other than the facilitation of ester interchange, since interchange is not necessary for viscosity development in the instances described. Where a relatively common low equivalent weight diol is shown, it is used for economic reasons and convenience in adjusting total functionality of the mixture.

Branched formulations given as examples of the types of materials we are hoping to establish as functional fluids for physiological separations are formulated on the following principles:

1. A framework of diol (usually, but not necessarily, propylene glycol) and triol (such as glycerine), with a monobasic terminator to permit achievement of high degrees of condensation without gelation, is established. The framework permits introduction of 0.7 additional equivalents of acid to bring it into balance.

2. An equivalents excess of hydroxyl is allowed for, in this case 4%, which avoids stalling and favors fluidity; the remaining acid component is then 0.66 eq.

3. The dibasic acid parents of the repeating units are charged at equivalent fractions defined as: equivalents used/total eq. dibasic acids. At least four different ratios are used to determine the composition-density relationship within the framework of para. 1.

4. The critical gel point is calculated as shown in table 1. Experience has taught that when glycerine is used as the source of branch units, the reaction can be carried to a degree of completion which substantially exceeds the calculated value (F. W. Billmeyer, Jr., *Textbook of Polymer Science,* 2nd Ed., New York, Wiley, 1971, pp. 272–274). The acid and hydroxyl values reported generally represent $\geq 90\%$ conversion of functional groups.

Working examples in the adipic-dimer range were successfully condensed to 3000–4000 cSt/99° C., exhibiting $\rho_{25}$ 1.024 and 1.044 g/cc, and presumably feasible from 1.01 to 1.055 g/cc; for higher density requirements, it is necessary to change the framework of pelargonic-glycerol-PG within which the ratios of dibasic acids have been varied to achieve the required properties.

An embodiment of the invention is the conversion of a small part of the product to a soap of a monovalent or multivalent ion, using the residual acid value as a reactive site. The pseudopolymeric characteristics of such a soap or ionomer would be expected to confer characteristics of a reinforced polyester fluid to the base material at low loading.

The details of the viscous polyester fluids, ingredients and process will now be discussed.

The polyesters according to the invention are produced in the form of viscous liquids, having a density at room temperature in the range of 1.015–1.09 g/cc and preferably from 1.02 to 1.035 g/cc.

The physical and chemical properties of these polyesters are uniformly maintained over extended periods prior to use, as well as during transportation and processing of blood samples.

The branched polyesters of the invention are characterized by having an acid value of 2 to 15, preferably 6 to 9 and a hydroxyl value of 10 to 70, preferably 38 to 54. The finished branched polyesters of the invention will typically have a viscosity greater than, or equal to, 1700 cSt, and preferably greater than, or equal to, 3000 cSt, when measured at 99° C.

Fluids having the above-described properties are especially useful as blood partitioning agents in blood collection vessels where they provide a continuous integral barrier or seal between the serum and clot portions of blood. In other words, the fluid completely partitions the separated phases so that the serum and cellular or clot portions are no longer in contact at any point, forming a unitary seal which firmly adheres to the inner surface of the blood collection vessel. By forming a continuous, integral barrier in this way, it is possible to easily remove the serum or plasma portion by decanting or pipetting, with the clot portion remaining undisturbed in the collection vessel.

The hydroxyl-functional initiator has a functionality greater than 2. Examples include trimethylolpropane, trimethylolethane, glycerol, 1,2,6-hexanetriol, pentaerythritol, alkyl polyglycosides such as the lauryl ether of mixed glucose dimer-trimer, sorbitol, castor oil, and their alkoxylates and the like.

The dicarboxylic acid member of the polyesters of the invention is primarily selected for economy in achieving the selected properties and the optimal choice may depend on market value. However, typical candidate diacids include: adipic acid, phthalic anhydride, dodecanedioic acid, dodecenylsuccinic acid, succinic acid, glutaric acid, pimelic acid, suberic acid, azelaic acid, sebacic acid, undecanedioic acid, terephthalic acid, isophthalic acid, dimerized fatty acids and mixtures thereof. Dimerized fatty acids are also known as polymerized fatty acids, which include aliphatic dicarboxylic acids having from 32–40 carbon atoms obtained by the polymerization of olefinically unsaturated monocarboxylic acids having from 16–20 carbon atoms, such as palmitoleic acid, oleic acid, linoleic acid, linolenic acid and the like. Polymeric fatty acids and processes for their production are well known. See, for example, U.S. Pat. Nos. 2,793,219 and 2,955,121. Polymeric fatty acids particularly useful in the practice of this invention preferably will have as their principal component C-36 dimer acid. Such C-36 dicarboxylic acids are obtained by the dimerization of two moles of a C-18 unsaturated monocarboxylic acid, such as oleic acid or linoleic acid, or mixtures thereof, e.g., tall oil fatty acids. These products typically contain 75% by weight or more of C-36 dimer acid and have an acid value in the range of 180–215, saponification value in the range of 190–215 and neutral equivalent from 265–310. Examples of commercial dimer acids of this type are EMPOL® 1008, EMPOL® 1015, EMPOL® 1061, EMPOL® 1016, EMPOL® 1018, EMPOL® 1022 and EMPOL® 1024, all trademarked products of the Henkel Corporation, and identified hereinafter as a class as "C-36 dimer acid." The dimer acids may be hydrogenated prior to use. To increase the C-36 dimer content and reduce the amount of by-product acids, including unreacted monobasic acid, trimer and higher polymer acids, the polymeric fatty acid may be molecularly distilled or otherwise fractionated. EMPOL® 1016, used in the examples below, is a typical C-36 dimer acid and has an acid value in the range from 190 to 198 and a saponification value of 197.

It will be apparent to those skilled in the art that the various art-recognized equivalents of the aforementioned dicarboxylic acids, including anhydrides thereof, may be employed in preparing the polyesters of the invention. Accordingly, as used herein, the term "acid" is intended to encompass such acid derivatives. Mixtures of acids and anhydrides may also be reacted to obtain the desired product. Also, the acid residues of the polyester may originate from acid chlorides or other acid precursors.

Suitable diols which may be reacted with the above described dicarboxylic acid(s) to yield the polyesters of the invention include diols of the formula:

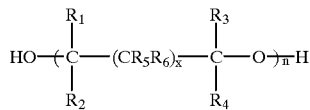

in which $R_1$, $R_2$, $R_3$, $R_4$, $R_5$ and $R_6$ are independently selected from the group consisting of hydrogen and an alkyl group having 1–4 carbon atoms, n =1–4 and x=0–4. Representative diols falling within the foregoing formula include ethylene glycol, neopentylglycol, 1,3-butanediol, 1,4-butanediol, propylene glycol, diethylene glycol, triethylene glycol, 1,2-butanediol, 3-methyl-1,5-pentanediol, 1,2-pentanediol, 1,3-pentanediol, 1,4-pentanediol, 1,5-pentanediol, hexylene glycol, 1,6-hexanediol, polytetramethylene ether diol, cyclohexanedimethanol, benzenedimethanol, polyoxypropylene diol, dipropylene glycol, trimethylpentanediol, propoxylated bisphenol A, 1,4-Bis(2-hydroxyethoxy)benzene, tetramethylene adipate glycol, polycaprolactone glycol, polyhexamethylenecarbonate glycol, 1,6-hexanediol and hydrogenated bisphenol A and the like and mixtures thereof. The preferred diols contain from 3–5 carbon atoms, with particularly useful polyester products being obtained using neopentyl glycol, propylene glycol, triethylene glycol, or mixtures thereof. In a particularly preferred embodiment of the invention, in which a mixture of neopentyl glycol and propylene glycol is used, the amount of neopentyl glycol comprises 70 to 95 equivalent percent, and the amount of propylene glycol comprises 5 to 30 equivalent percent of the total diol component equivalents. The diol and triol residues of the polyesters of the invention may originate from sodium alcoholates or other alcohol precursors.

The monocarboxylic acid chain terminator can be any organic acid, but aliphatic fatty acids are preferred. Examples include isostearic acid, coconut fatty acids, oleic acid, linoleic acid, tallow fatty acids, stearic acid, caprylic acid, capric acid, lauric acid, myristic acid, palmitic acid, soya fatty acid, pelargonic acid, heptanoic acid and the like.

If an improvement in color is desired, the polyester may be bleached by any of the well known and acceptable bleaching methods, e.g., using hydrogen peroxide or chlorite. Alternatively, the polyester may be decolorized by filtering through a filter aid, charcoal or bleaching clay.

To prepare the polyesters, a small excess (based on the equivalents of acid present) of a volatile diol may used. The excess diol also serves as the reaction medium and reduces the viscosity of the reaction mixture. The excess diol is distilled off as the esterification is carried to completion and may be recycled to the reactor if desired. Generally, 20% by weight excess volatile diol, based on the total weight of the diol component, will suffice. Where a volatile and a relatively involatile diol are present together, any excess is supplied as additional volatile diol. The more volatile glycols are commonly used for this purpose. Among them are propylene glycol, ethylene glycol, 1,3-butanediol, 1,4-butanediol, 1,2- butanediol, 3-methyl-1,5-pentanediol, 2-methyl-1,3-propanediol and the like.

The source of the acids or acid derivatives and the manner by which the dicarboxylic acid blends are prepared, in those embodiments where such blends are used, is of no consequence so long as the resulting blend contains the specified acids or acid derivatives in the required ratios. Thus, dicarboxylic acid or acid derivative blends may be obtained by mixing the individual acid components. On the other hand, mixtures of acid obtained as by-products from various manufacturing operations and which contain one or more of the necessary acid components may be advantageously utilized. For example, mixed succinic, glutaric and adipic acids may be obtained as a co-product from the manufacture of adipic acid and may be conveniently blended with any other acid, e.g. oleic dimer acid, selected for inclusion in the polyester of the invention.

Preparation of blood partitioning compositions using the polyesters of the invention may be carried out in the manner described in commonly owned U.S. Pat. Nos. 4,101,422 and 4,148,764, the entire disclosures of which are incorporated by reference in the present specification, as if set forth herein in full.

The following examples are presented to illustrate the invention more fully, and are not intended, nor are they to be construed, as a limitation of the scope of the invention.

EXAMPLE 1

A 5 liter reactant charge was prepared for a one-pot synthesis, the ingredients were in the following ratio: 0.518 equivalent adipic acid, 0.3 eq. pelargonic acid, 0.142 equivalent EMPOL® 1016, 0.3 equivalent propylene glycol, and 0.7 equivalent glycerol. It was heated to a final temperature of 200° C. until esterification was complete as indicated by a cessation in the reduction of the acid value of the reaction product. The polyester recovered had an acid value equal to 8.2 mg KOH/g, a hydroxyl value of 53.6, 99° C. kinematic viscosity of 3890 cSt and a specific gravity at 25° C. of 1.024. This corresponds in FIG. 1 to a density 3 of 1.024 g/cc.

EXAMPLE 2

A 5 liter reactant charge was prepared for a one-pot synthesis, the ingredients were in the following ratio: 0.585 equivalent adipic acid, 0.3 eq. pelargonic acid, 0.075 equivalent EMPOL® 1016, 0.3 equivalent propylene glycol, and 0.7 equivalent glycerol. It was heated to a final temperature of 210° C., followed by low-vacuum stripping. The polyester recovered had an acid value of 6.5 mg KOH/g, a hydroxyl value of 38.4, 99° C. kinematic viscosity of 3870 cSt and a specific gravity at 25° C. of 1.0444. This corresponds in FIG. 1 to a density 11 of 1.044 g/cc.

EXAMPLES 3–7

Additional experiments were done with pelargonic acid, propylene glycol and glycerol equivalents as above, but varying the adipic acid within 0.515 to 0.634 equivalents, while varying the EMPOL 1016 from within 0.145 to 0.026 equivalents. The results are shown in FIG. 1 as densities 5, 7, 9, 13 and 15. When the results of each example are fitted to a curve 1, the density of the polyester resulting from the reaction equals $1.7474-1.9297X+1.2848X^2$ g/cc, wherein X equals the equivalents fraction of adipic acid. The goodness of fit, $r^2$, is 0.9922.

While the present invention has been described and exemplified above in terms of certain preferred embodiments, various other embodiments may be apparent to those skilled in the art. Accordingly, the invention is not limited to the embodiments specifically described and exemplified, but variations and modifications may be made therein and thereto without departing from the spirit of the invention, the full scope of which is delineated by the following claims.

What is claimed is:

1. A viscous liquid branched polyester, which comprises the reaction product of:
   at least one hydroxyl-functional initiator with functionality greater than 2;
   at least one dicarboxylic acid chain extender;
   at least one diol chain extender; and
   at least one monocarboxylic acid chain terminator.

2. A polyester in accordance with claim 1, wherein the hydroxyl-functional initiator is selected from the group consisting of trimethylolpropane, trimethylolethane, glycerol, 1,2,6-hexanetriol, pentaerythritol, alkyl polyglycosides, sorbitol, castor oil and their alkoxylates and mixtures thereof.

3. A polyester in accordance with claim 1, wherein the dicarboxylic acid is selected from the group consisting of adipic acid, phthalic anhydride, dodecanedioic acid, dodecenylsuccinic acid, succinic acid, glutaric acid, pimelic acid, suberic acid, azelaic acid, sebacic acid, undecanedioic acid, terephthalic acid, isophthalic acid, dimerized fatty acids and mixtures thereof.

4. A polyester in accordance with claim 1, wherein the diol is selected from the group consisting of ethylene glycol, neopentylglycol, 1,3-butanediol, 1,4-butanediol, propylene glycol, diethylene glycol, triethylene glycol, 1,2-butanediol, 3-methyl-1,5-pentane diol, 2-methyl-1,3-propanediol, 1,2-pentane diol, 1,3-pentane diol, 1,4-pentane diol, hexylene glycol, polytetramethylene ether diol, cyclohexanedimethanol, benzenedimethanol, polyoxypropylene diol, dipropylene glycol, trimethylpentanediol, propoxylated bisphenol A, 1,4-Bis(2-hydroxyethoxy)benzene, tetramethylene adipate glycol, polycaprolactone glycol, polyhexamethylenecarbonate glycol, 1,6-hexanediol, hydrogenated bisphenol A and mixtures thereof.

5. A polyester in accordance with claim 1, wherein the monocarboxylic acid chain terminator is selected from the group consisting of isostearic acid, coconut fatty acids, oleic acid, linoleic acid, tallow fatty acids, stearic acid, caprylic acid, capric acid, lauric acid, myristic acid, palmitic acid, soya fatty acid, pelargonic acid, heptanoic acid and mixtures thereof.

6. A polyester in accordance with claim 1, wherein the polyester has a density of about 1.02 to about 1.06 g/cc.

7. A polyester in accordance with claim 1, wherein the polyester has a density of about 1.02 to about 1.045 g/cc.

8. A polyester in accordance with claim 1, wherein the polyester has a viscosity greater than, or equal to, 2000 cSt, when measured at 99° C.

9. A polyester in accordance with claim 1, wherein the polyester has a viscosity greater than, or equal to 3000 cSt, when measured at 99° C.

10. A polyester in accordance with claim 1, comprising the reaction product of:
    from about 0.55 to about 0.70 equivalents of the hydroxyl-functional initiator with functionality greater than 2;
    from about 0.62 to about 0.65 equivalents of the dicarboxylic acid chain extender;
    from about 0.30 to about 0.45 equivalents of the diol chain extender; and
    from about 0.30 to about 0.33 equivalents of the monocarboxylic acid chain terminator.

11. In a process for performing a physiological fluid separation with a vehicle, wherein the improvement comprises separating with the viscous liquid branched polyester of claim 1 as the vehicle.

12. A polyester in accordance with claim 1, further comprising silica.

13. A polyester in accordance with claim 1, further comprising a coupling agent.

14. A polyester in accordance with claim 1, wherein the polyester has a density of about 1.015 to about 1.09 g/cc.

15. A polyester in accordance with claim 1, wherein the polyester has a density of about 1.02 to about 1.055 g/cc.

16. A polyester in accordance with claim 1, wherein said diol has the general formula:

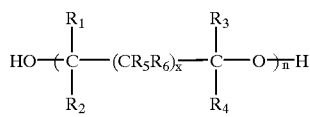

wherein $R_1$, $R_2$, $R_3$, $R_4$, $R_5$ and $R_6$ are independently selected from the group consisting of hydrogen and alkyl having 1–4 carbon atoms, n=1–4 and x=0–4.

17. A polyester in accordance with claim 1, wherein the polyester has a viscosity of from about 1700 cSt to about 4500 cSt at 99° C.

18. A polyester in accordance with claim 1, wherein the polyester has hydroxyl number from about 38 and to about 54.

19. A process for making the polyester reaction product of claim 1, which comprises:
   mixing at least one hydroxyl-functional initiator with functionality greater than 2, at least one dicarboxylic acid chain extender, at least one diol chain extender and at least one monocarboxylic acid chain terminator;
   heating the mixture to effect esterification; and
   withholding distillate from the mixture undergoing esterification.

20. The product of the process of claim 19.

21. A viscous liquid branched polyester, comprising the reaction product of about 0.55 equivalents of glycerol, about 0.62 equivalents of phthalic anhydride, about 0.45 equivalents of propylene glycol, about 0.165 equivalents of pelargonic acid and about 0.165 equivalents of isostearic acid.

22. A viscous liquid branched polymer, comprising the reaction product of about 0.64 equivalents of glycerol, about 0.62 equivalents of phthalic anhydride, about 0.36 equivalents of propylene glycol, about 0.165 equivalents of pelargonic acid and about 0.165 equivalents of isostearic acid.

23. A viscous liquid branched polymer, comprising the reaction product of about 0.7 equivalents of glycerol, about 0.51 equivalents of adipic acid, about 0.14 equivalents of dimer acid, about 0.3 equivalents of propylene glycol and about 0.3 equivalents of pelargonic acid.

24. A viscous liquid branched polyester, comprising the reaction product of reactants selected from the group consisting of isostearic acid, pelargonic acid adipic acid, dodecanedioc acid, phthalic anhydride, mother liquor acid, azelaic acid, dimer acid, propylene glycol, 1,3-butylene glycol, 1,4-butanediol, ethylene glycol, neopentyl glycol, trimethylolpropane glycerol and mixtures thereof, wherein said reactants are selected so that the total selection has a gel point from about 0.83 to about 0.93.

25. A viscous liquid branched polymer, comprising the reaction product of about 0.7 equivalents of glycerol, about 0.515 to about 0.634 equivalents of adipic acid, about 0.145 to about 0.026 equivalents of dimer acid, about 0.3 equivalents of propylene glycol and about 0.3 equivalents of pelargonic acid.

26. A viscous liquid branched polyester, which comprises:
   at least one hydroxyl-functional initiator residue with functionality greater than 2;
   at least one dicarboxylic acid residue chain extender;
   at least one diol residue chain extender; and
   at least one monocarboxylic acid residue chain terminator.

27. A polyester in accordance with claim 26, wherein the hydroxyl-functional initiator resdues is selected from the group consisting of trimethylolpropane residue, trimethylolethane residue, glycerol residue, 1,2,6-hexanetriol residue, pentaerythritol residue, alkyl polyglycoside residues, sorbitol residue, castor oil residue and their alkoxylate residues and mixtures thereof.

28. A polyester in accordance with claim 26, wherein the dicarboxylic acid residue is selected from the group consisting of adipic acid residue, phthalic anhydride residue, dodecanedioic acid residue, dodecenylsuccinic acid residue, succinic acid residue, glutaric acid residue, pimelic acid residue, suberic acid residue, azelaic acid residue, sebacic acid residue, undecanedioic acid residue, terephthalic acid residue, isophthalic acid residue, dimerized fatty acid residues and mixtures thereof.

29. A polyester in accordance with claim 26, wherein the diol residue is selected from the group consisting of ethylene glycol residue, neopentylglycol residue, 1,3-butanediol residue, 1,4-butanediol residue, propylene glycol residue, diethylene glycol residue, triethylene glycol residue, 1,2-butanediol residue, 3-methyl-1 residue, 5-pentane diol residue, 2-methyl-1,3-propanediol residue, 1,2-pentane diol residue, 1,3-pentane diol residue, 1,4-pentane diol residue, hexylene glycol residue, polytetramethylene ether diol residue, cyclohexanedimethanol residue, benzenedimethanol residue, polyoxypropylene diol residue, dipropylene glycol residue, trimethylpentanediol residue, propoxylated bisphenol A residue, 1,4-Bis(2-hydroxyethoxy)benzene residue, tetramethylene adipate glycol residue, polycaprolactone glycol residue, polyhexamethylenecarbonate glycol residue, 1,6-hexanediol residue, hydrogenated bisphenol A residueand mixtures thereof.

30. A polyester in accordance with claim 26, wherein the monocarboxylic acid residue chain terminator is selected from the group consisting of isostearic acid residue, coconut fatty acid residues, oleic acid residue, linoleic acid residue, tallow fatty acid residues, stearic acid residue, caprylic acid residue, capric acid residue, lauric acid residue, myristic acid residue, palmitic acid residue, soya fatty acid residue, pelargonic acid residue, heptanoic acid residue and mixtures thereof.

31. A polyester in accordance with claim 26, wherein the polyester has a density of about 1.02 to about 1.06 g/cc.

32. A polyester in accordance with claim 26, wherein the polyester has a density of about 1.02 to about 1.045 g/cc.

33. A polyester in accordance with claim 26, wherein the polyester has a viscosity greater than, or equal to, 2000 cSt, when measured at 99° C.

34. A polyester in accordance with claim 26, wherein the polyester has a viscosity greater than, or equal to 3000 cSt, when measured at 99° C.

35. In a process for performing a physiological fluid separation with a vehicle, wherein the improvement comprises separating with the viscous liquid branched polyester of claim 26 as the vehicle.

36. A polyester in accordance with claim 26, further comprising silica.

37. A polyester in accordance with claim 26, further comprising a coupling agent.

38. A polyester in accordance with claim 26, wherein the polyester has a density of about 1.015 to about 1.09 g/cc.

39. A polyester in accordance with claim 26, wherein the polyester has a density of about 1.02 to about 1.055 g/cc.

40. A polyester in accordance with claim 26, wherein the polyester has a viscosity of from about 1700 cSt to about 4500 cSt at 99° C.

41. A polyester in accordance with claim 26, wherein the polyester has hydroxyl number from about 38 and to about 54.

* * * * *